(12) United States Patent
Choi et al.

(10) Patent No.: US 6,181,448 B1
(45) Date of Patent: Jan. 30, 2001

(54) MULTI-LASER SCANNING UNIT

(75) Inventors: Hwan-young Choi, Anyang; Won-hyung Lee; Sung-min Cho, both of Seoul; Moon-gyu Lee, Suwon; Jee-hong Min; Young-il Kim, both of Yongin; Jin-seung Choi; Jae-yong Eum, both of Suwon, all of (KR)

(73) Assignee: Samsung Electronics Co., Ltd., Kyungki-do (KR)

( * ) Notice: Under 35 U.S.C. 154(b), the term of this patent shall be extended for 0 days.

(21) Appl. No.: 09/427,073

(22) Filed: Oct. 26, 1999

(30) Foreign Application Priority Data

Nov. 14, 1998 (KR) .................................................. 98-48883

(51) Int. Cl.$^7$ ...................................................... G02B 5/32
(52) U.S. Cl. ................................ 359/18; 359/15; 359/16; 359/17; 347/118; 369/103
(58) Field of Search .................................... 359/15, 16, 17, 359/18; 369/103; 347/118

(56) References Cited

U.S. PATENT DOCUMENTS 4,761,046 * 8/1988 Funato .................................... 359/18
5,182,659 * 1/1993 Clay et al. ............................. 359/17

* cited by examiner

Primary Examiner—Cassandra Spyrou
Assistant Examiner—Craig Curtis
(74) Attorney, Agent, or Firm—Sughrue, Mion, Zinn, Macpeak & Seas, PLLC (57) ABSTRACT

A multi-laser scanning unit (LSU) in which scanning lines incident parallel onto a photoreceptor have the same scanning direction. The multi-laser scanning unit includes: a driving source for providing a rotatory force; a deflection disk installed around a rotary shaft of the driving source having a plurality of sectors each with a hologram pattern for diffracting and deflecting incident light, for scanning light through rotation; a plurality of light sources installed facing one surface of the deflection disk for irradiating a plurality of light lines onto predetermined points of the deflection disk; and a light path changing portion for changing traveling paths of the plurality of scanning lines formed by the rotation of the deflection disk, wherein the plurality of light sources are arranged such that two incident points which are the farthest from each other among the plurality of incident points formed on the deflection disk form 180° with the center point of the deflection disk.

3 Claims, 7 Drawing Sheets

MULTI-LASER SCANNING UNIT

BACKGROUND OF THE INVENTION

1. Field of the Invention

The present invention relates to a multi-laser scanning unit (LSU) capable of diffracting and scanning light incident from a plurality of light sources, and more particularly, to a multi-LSU in which a plurality of scanning lines (rays) are directionally the same and incident onto an image of a photoreceptor.

2. Description of the Related Art

In general, a multi-LSU is adopted in a color printer and is used to form a plurality of latent electrostatic images required to develop a color image in combination with a plurality of colors including yellow (Y), magenta (M), cyan (C), black (K), and the like. In this case, a plurality of scanning lines scanned by the multi-LSU and incident onto a photoreceptor such as a photosensitive belt or photosensitive drum, must be parallel at predetermined intervals, such that scanning directions of the plurality of scanning lines are parallel each other.

Figure 1:
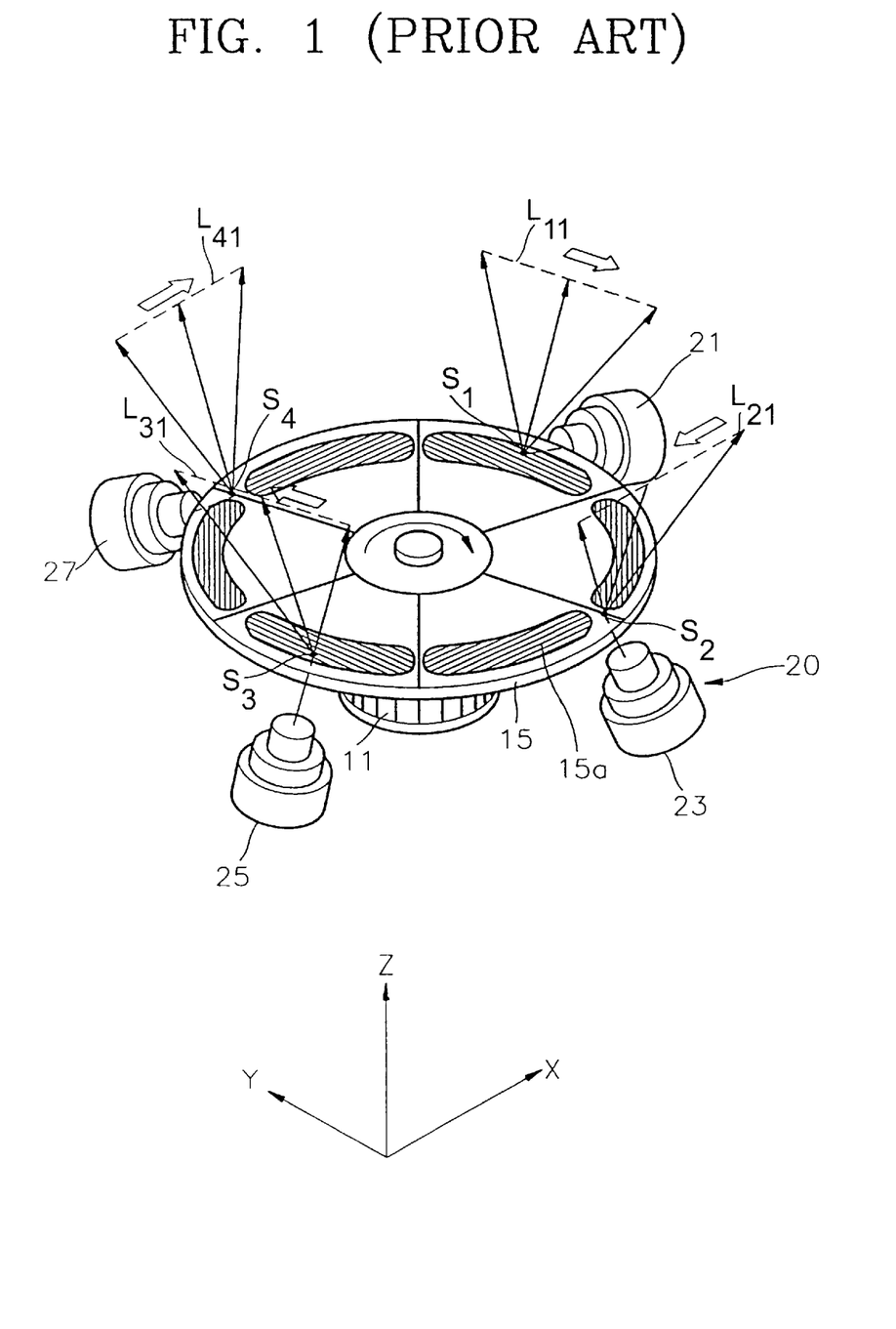
FIG. 1 is a schematic perspective view of the main portions of a conventional multi-laser scanning unit (LSU)
Figure 2:
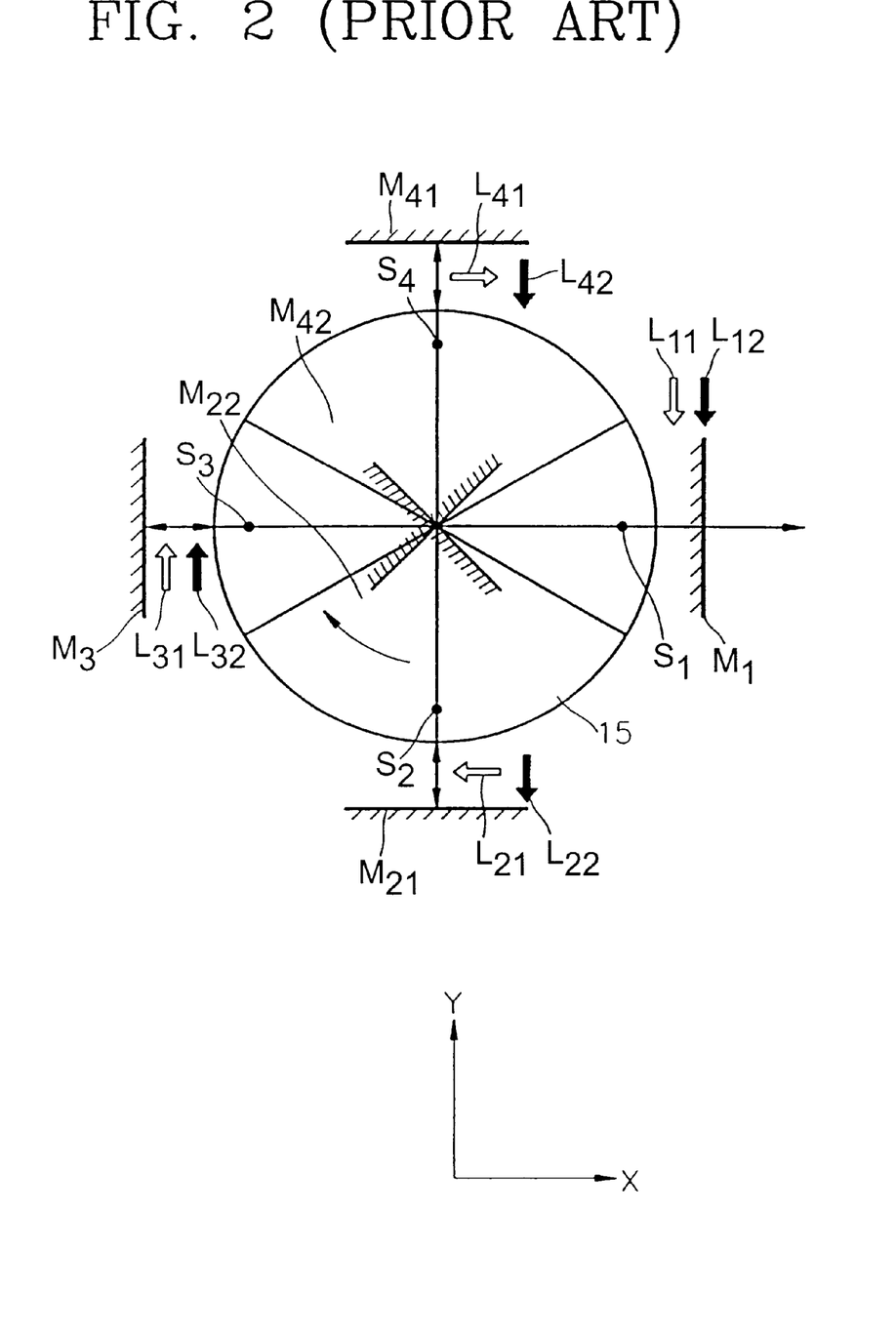
FIG. 2 is a plan view showing the optical arrangement of the conventional multi-LSU for parallel scanning lines.
Figure 3:
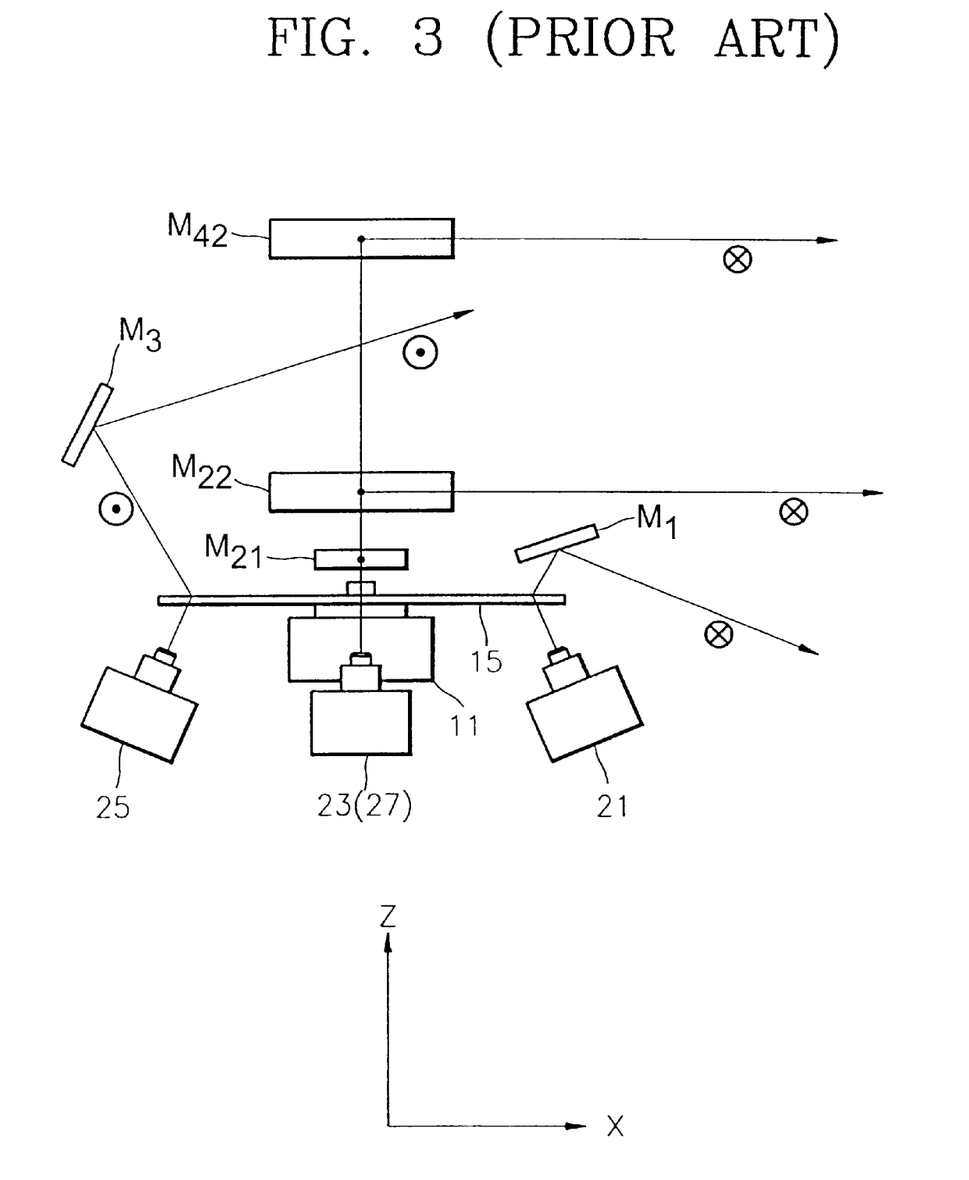
FIG. 3 is a side view of FIG. 2.

Referring to FIGS. 1 through 3, a conventional multi-LSU capable of generating four scanning lines corresponding to the colors Y, M, C and K, includes a driving source 11 for providing a rotatory force, a deflection disk 15 having a plurality of sectors each with a hologram pattern 15a, and a light source unit 20 which is arranged facing one surface of the deflection disk 15 and which radiates light onto the deflection disk 15. The light source unit 20 includes four light sources 21, 23, 25 and 27, which irradiate light onto four incident points $S_1$, $S_2$, $S_3$ and $S_4$, respectively, wherein each pair of points adjacent to each other form a right angle at the rotary center of the deflection disk 15. Also, the four incident points $S_1$, $S_2$, $S_3$ and $S_4$, are placed with equal radii from the rotary center of the deflection disk 15.

The incident light lines are diffracted by the hologram patterns 15a by rotation of the deflection disk 15 and form scanning lines $L_{11}$, $L_{21}$, $L_{31}$ and $L_{41}$ in the directions indicated by the arrow (→). Here, the scanning lines $L_{11}$ and $L_{31}$ are parallel (to the Y-axis) and are opposite in direction. Also, the scanning lines $L_{21}$ and $L_{41}$, perpendicular to the scanning lines $L_{11}$ and $L_{31}$, are parallel (to the X-axis) and are opposite in direction.

Traveling paths of the scanning lines $L_{11}$, $L_{21}$, $L_{31}$ and $L_{41}$ are changed by a plurality of mirrors such that the centers of the scanning lines travel along the X-axis. That is, the scanning line $L_{11}$ is reflected by a mirror $M_1$ to travel in the X-axis direction, and the scanning line $L_{21}$ is reflected by a mirror $M_{21}$ toward the rotary center of the deflection disk 15 and then reflected again by a mirror $M_{22}$ positioned on the rotary center of the deflection disk 15 to travel in the X-axis direction. Also, the scanning line $L_{31}$ is reflected by a mirror $M_3$ to travel in the X-axis direction, and the scanning line $L_{41}$ is reflected by a mirror $M_{41}$ toward the rotary center of the deflection disk 15 and reflected again by a mirror $M_{42}$ positioned on the rotary center of the deflection disk 15 to travel in the X-axis direction.

Scanning directions of scanning lines $L_{12}$, $L_{22}$, $L_{32}$ and $L_{42}$, scanning in the X-axis direction after being reflected by the mirrors $M_1$, $M_{21}$, $M_{22}$, $M_3$, $M_{41}$ and $M_{42}$, are indicated by the arrow (→) in FIG. 2. As shown in FIG. 2, the scanning lines $L_{12}$, $L_{22}$ and $L_{42}$, have the same scanning directions, but the direction of the scanning line $L_{32}$ is opposite to that of the scanning lines $L_{12}$, $L_{22}$ and $L_{42}$.

That is, in the case of using a plurality of mirrors and post-holographic optical elements to change the traveling path of the light, after being reflected by the mirrors $M_1$, $M_{22}$, $M_3$ and $M_{42}$, the plurality of scanning lines are parallel in scanning directions for a photoreceptor, but the direction of the scanning line $L_{32}$ is still opposite to that of the others.

Thus, when forming an image on the photoreceptor, image information must be compensated for in the circuitry due to the different scanning directions. That is, the light source 25 providing the scanning line $L_{32}$ must transfer the image data in the opposite direction to match the image provided by the remaining light sources 21, 23 and 27. That is, there is a disadvantage in that the light sources 21, 23 and 27 provide image information in the direction indicated by ⓧ while the light source 25 provides image information in the direction indicated by ⊙ as shown in FIG. 3, so that image data processing is complicated.

SUMMARY OF THE INVENTION

To solve the above problem, it is an object of the present invention to provide a multi-laser scanning unit (LSU) in which a plurality of scanning lines formed by a deflection disk having the same scanning direction.

Accordingly, to achieve the above object, there is provided a multi-laser scanning unit (LSU) comprising: a driving source for providing a rotatory force; a deflection disk installed around a rotary shaft of the driving source having a plurality of sectors each with a hologram pattern for diffracting and deflecting incident light, for scanning light through rotation; a plurality of light sources installed facing one surface of the deflection disk for irradiating a plurality of light lines onto predetermined points of the deflection disk; and a light path changing means for changing traveling paths of the plurality of scanning lines formed by the rotation of the deflection disk, wherein the plurality of light sources are arranged such that two incident points which are the farthest from each other among the plurality of incident points formed on the deflection disk form 180° with the center point of the deflection disk.

BRIEF DESCRIPTION OF THE DRAWINGS

The above object and advantages of the present invention will become more apparent by describing in detail a preferred embodiment thereof with reference to the attached drawings in which.

DESCRIPTION OF THE PREFERRED EMBODIMENT

Referring to FIGS. 4 through 7, a multi-laser scanning unit (LSU) according to the present invention includes a driving source 31 for providing a rotatory force, a deflection disk 35 having a plurality of sectors 35a each with a hologram pattern, a light source unit 40 which is arranged facing the bottom of the deflection disk 35 and irradiates beams onto the deflection disk 35, and a light path changing means for changing a traveling direction of the light diffracted and scanned by the deflection disk 35.

Figure 4:
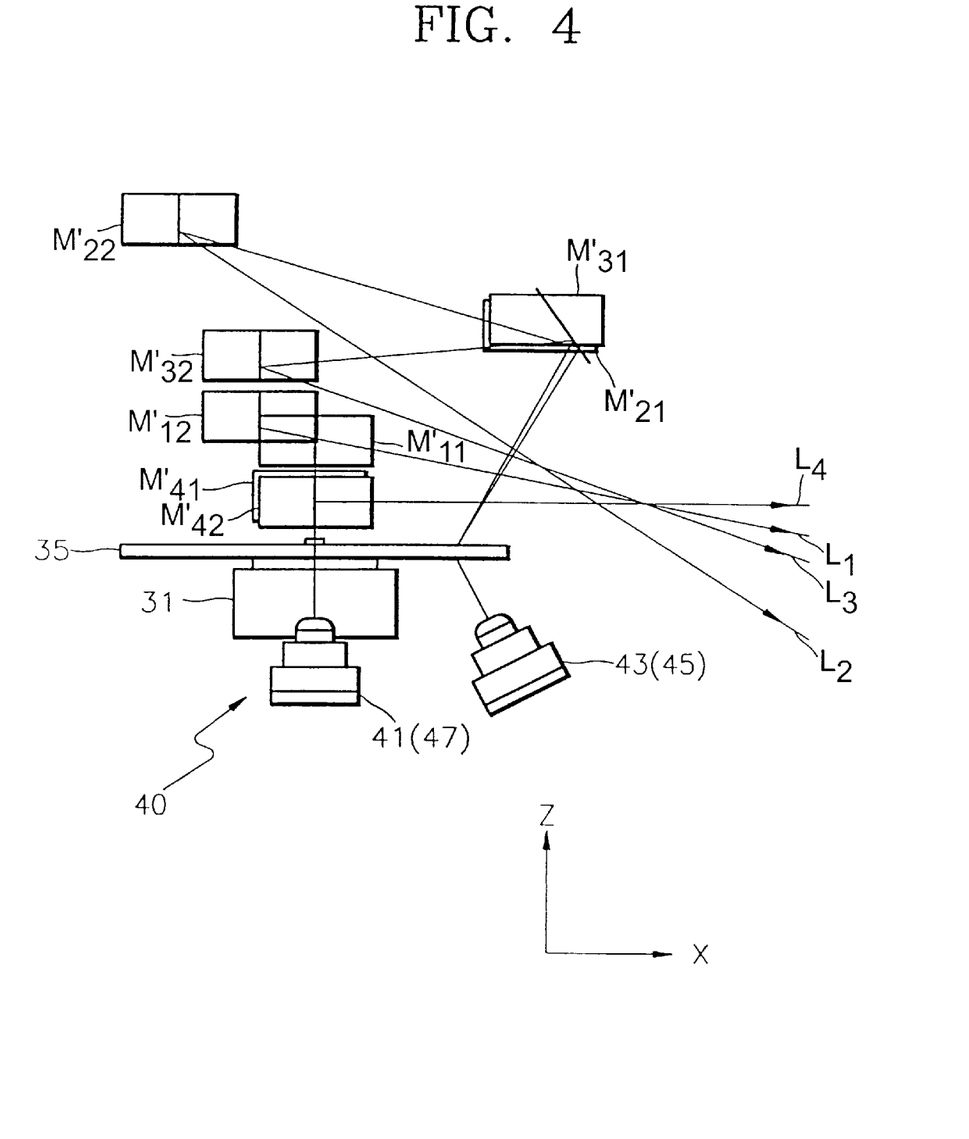
FIG. 4 is a plan view showing the main portions of a multi-LSU according to a preferred embodiment of the present invention.
Figure 5:
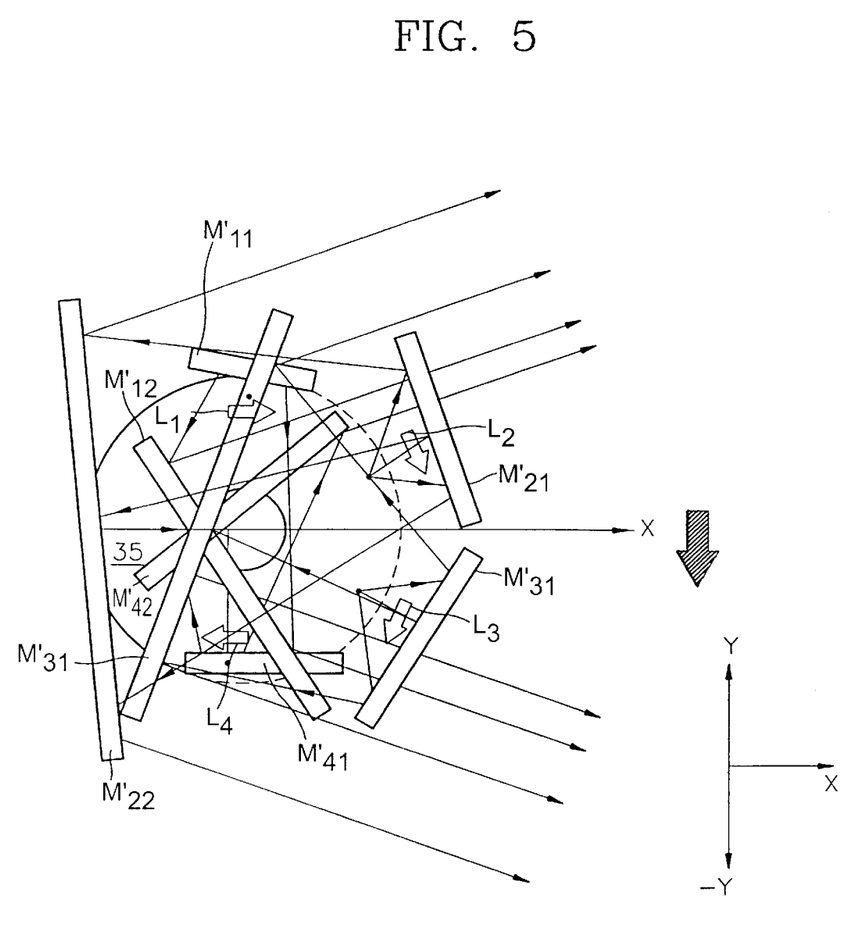
FIG. 5 is a plan view of FIG. 4.
Figure 6:
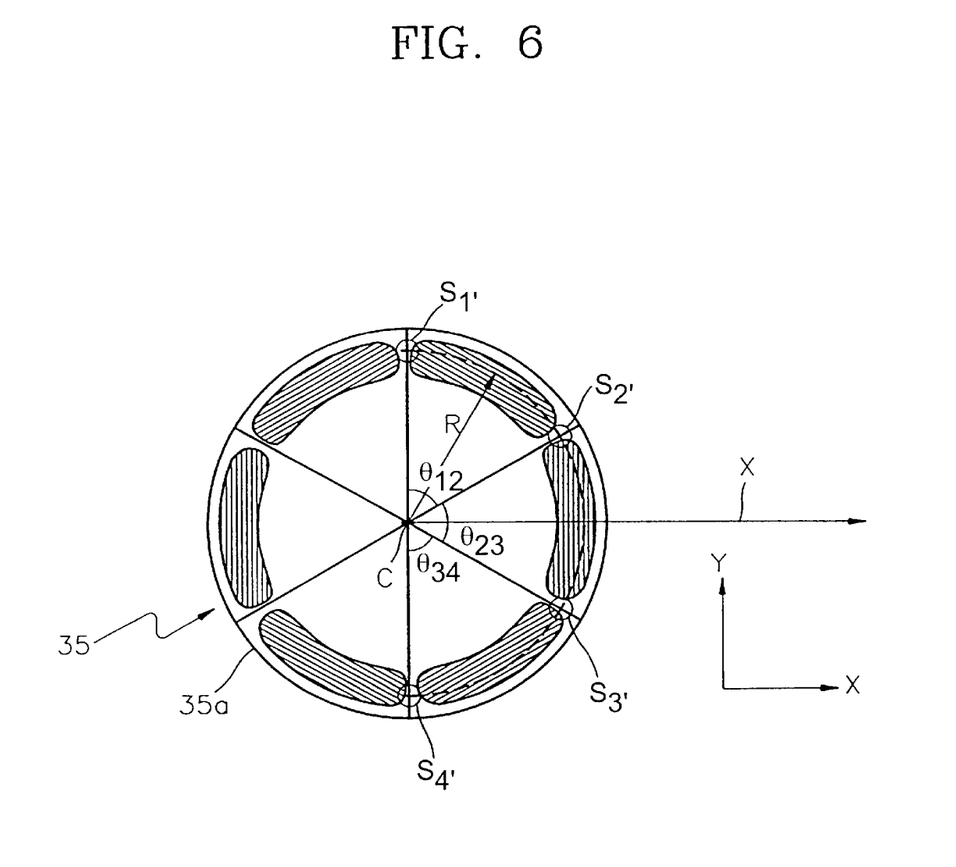
FIG. 6 is a schematic view showing the light incident locations on a deflection disk of the multi-LSU according to the present invention.

The light source unit 40 includes a plurality of light sources corresponding to each color, and preferably the light lines (rays) irradiated by the light sources are incident onto the deflection disk 35 such that two incident points which are the farthest from each other are located at an angle of 180° at the rotary center of the deflection disk 35. Also, the light lines emitted by the plurality of light sources are incident onto incident points of the deflection disk which are arranged at the same intervals and form circles of equal radii and have the same center points which are the rotary center of the deflection disk 35.

The light source unit 40 may include first through fourth light sources 41, 43, 45 and 47 corresponding to the colors of yellow (Y), magenta (M), cyan (C) and black (K). In this case, the light lines irradiated by the first through fourth light sources 41, 43, 45 and 47, are incident onto predetermined points $S_1', S_2', S_3'$ and $S_4'$ of the deflection disk 35. Here, the incident points $S_1', S_2', S_3'$ and $S_4'$, form circles of the same radii R centered around the rotary center of the deflection disk 35, and two incident points which are the farthest from each other, i.e., irradiated by the first and fourth light sources 41 and 47, form an angle of 180° or less at the center point C of the deflection disk 35. Preferably, the incident points $S_1', S_2', S_3'$ and $S_4'$ are located at the same intervals along the circles with the same radii R.

Here, the incident points $S_1'$, $S_2'$, $S_3'$ and $S_4'$ on the deflection disk 35, irradiated by the first through fourth light sources 41, 43, 45 and 47, pass the center point of the deflection disk 35 and the incident points $S_1'$ and $S_4'$, and $S_2'$ and $S_3'$ are symmetrical with respect to the X-axis (the light traveling direction). Also, the incident points $S_1', S_2', S_3'$ and $S_4'$ are located at the same intervals with the same angles at the center point C between adjacent incident points with, i.e., $\theta_{12}=\theta_{23}=\theta_{34}=60°$, and the angle between the incident points $S_1'$ and $S_4'$ which are the farthest from each other, i.e., $\theta_{12}+\theta_{23}+\theta_{34}$, is equal to 180°.

As described above, by defining the location of the light incident points onto the deflection disk 35, the centers of the scanning lines are in the same scanning direction along the X-axis after being reflected by a plurality of mirrors comprising the light path changing means, which will be described later.

That is, the scanning lines $L_1, L_2, L_3$ and $L_4$, are diffracted and scanned by the deflection disk 35 in the direction indicated by the arrow (→) and then the light traveling path is changed by the light path changing means such that the centers of the scanning lines $L_1, L_2, L_3$ and $L_4$, travel along the X-axis.

Here, the light path change means includes a plurality of planar mirrors $M12', M_{21}', M_{22}', M_{31}', M_{32}', M_{41}'$, and $M_{42}'$. The scanning line $L_1$ is reflected by the planar mirrors $M_{11}'$ and $M_{12}'$ in sequence such that the center of the scanning line travels in the X-axis direction and the scanning direction thereof is in the -Y-axis direction (the direction indicated by the arrow ↓ of FIG. 5). Also, the scanning lines $L_2$ and $L_4$ are reflected by the planar mirrors $M_{21}'$ and $M_{22}'$, and $M_{41}'$ and $M_{42}'$, respectively, in sequence such that the center of the scanning line travels in the X-axis and the scanning direction thereof is in the -Y-axis direction (the direction indicated by the arrow ↓ of FIG. 5). The scanning line $L_3$ is reflected by the planar mirrors $M_{31}'$ and $M_{32}'$ in sequence such that the center of the scanning line travels in the X-axis and the scanning direction thereof is in the -Y-axis direction (the direction indicated by the arrow ↓ of FIG. 5).

Figure 7:
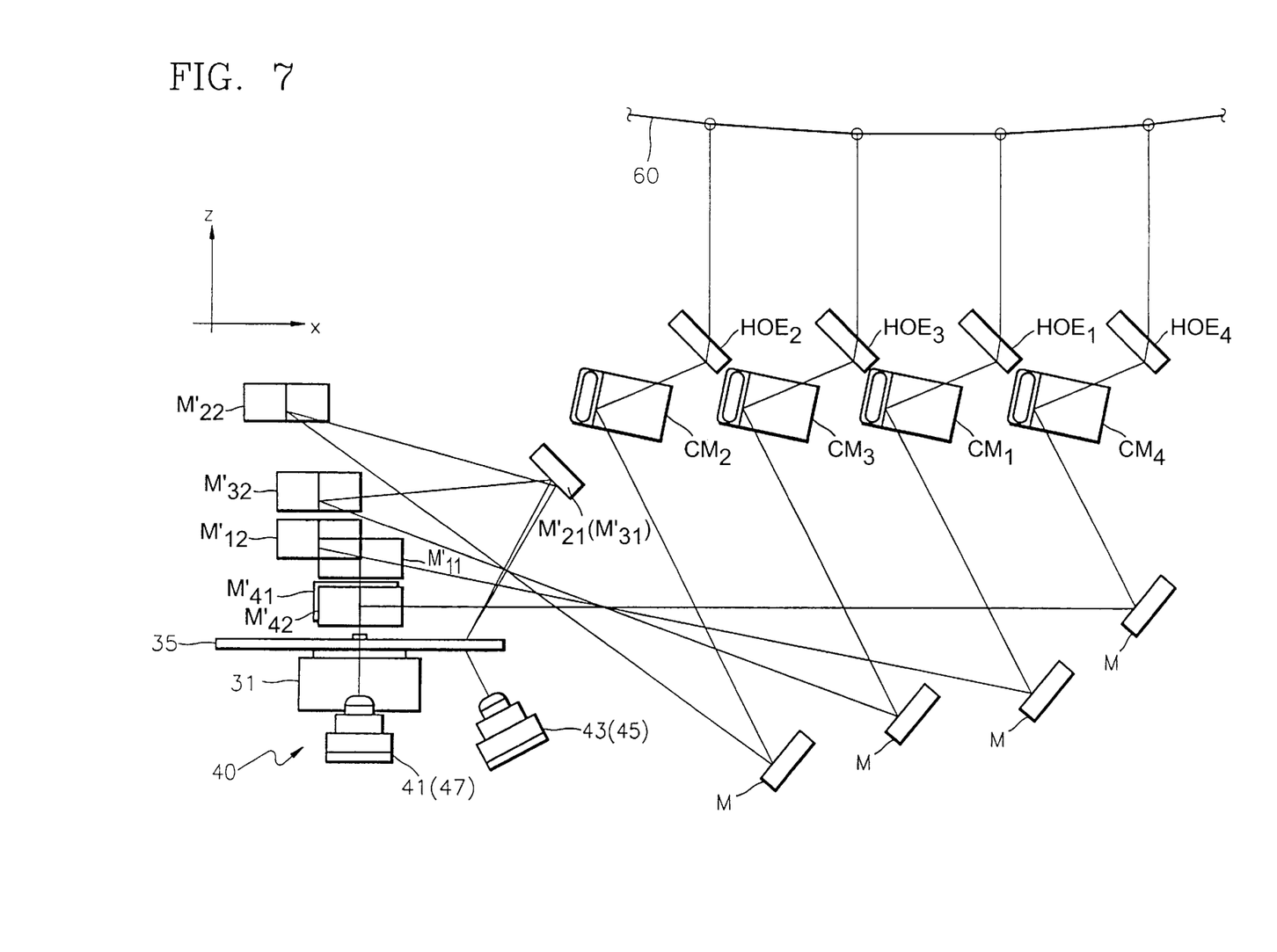
FIG. 7 is a schematic view showing the optical arrangement of the multi-LSU according to the present invention.

Preferably, as shown in FIG. 7, the light path changing means further comprises a plurality of planar mirrors M other than the above-mentioned mirrors, curved mirrors $CM_1, CM_2, CM_3$ and $CM_4$, and holographic optical elements $HOE_1, HOE_2, HOE_3$ and $HOE_4$.

The planar mirrors M reflect four scanning lines $L_1, L_2, L_3$ and $L_4$ with the scanning direction of -Y-axis and serves light traveling paths corresponding to each scan region on a photoreceptor 60.

The curved mirrors $CM_1, CM_2, CM_3$ and $CM_4$ converge and reflect the scanning lines incident via the plurality of the planar mirrors M such that the scanning lines become parallel, and correct bowing of the scanning lines which is due to diffraction of the incident light by the hologram pattern and rotation of the deflection disk 35.

The holographic optical elements $HOE_1, HOE_2, HOE_3$ and $HOE_4$ diffract and transmit the incident scanning lines at a predetermined angle such that the scanning lines head toward the photoreceptor 60 to be incident at a nearly right angle onto the photoreceptor 60.

In the multi-LSU according to the present invention, the incident points of the light lines onto the deflection disk are controlled in 180° or less with the rotary center of the deflection disk. Thus, it is not necessary to correct the scanning directions of the plurality of scanning lines formed by the deflection disk to the same direction and it is not necessary to invert the image signal in circuitry.

Also, by defining the location of the incident points of the light lines onto the deflection disk in 180° or less, the size of the plurality of planar mirrors $M_{11}', M_{12}', M_{21}', M_{22}', M_{31}', M_{32}', M_{41}'$, and $M_{42}'$, can be reduced. Also, by arranging the planar mirrors as shown in FIG. 7, the centers of the four scanning lines reflected by the planar mirrors $M_{12}', M_{22}', M_{32}'$ and $M_{42}'$, can be matched with the rotary center of the deflection disk.

It is contemplated that numerous modifications may be made to the apparatus and procedure of the invention without departing from the spirit and scope of the invention as defined in the following claims.

What is claimed is:

1. A multi-laser scanning unit (LSU) comprising:

a driving source for providing a rotary force;

a deflection disk installed around a rotary shaft of the driving source and having a center point, said deflection disk having a plurality of sectors each with a hologram pattern for diffracting and deflecting incident light, for scanning light through rotation to result in a plurality of scanning light lines;

a plurality of light sources installed facing one surface of the deflection disk, for irradiating a plurality of light lines onto a plurality of predetermined incident points on the deflection disk;

a light path changing means for changing traveling paths of the plurality of scanning lines formed by the rotation of the deflection disk, wherein the plurality of light sources are arranged such that two incident points which are farthest from each other among the plurality of incident points formed on the deflection disk form 180° with the center point of the deflection disk; and wherein the plurality of the light sources are arranged such that the incident points onto the deflection disk form circles of identical radii and are at identical intervals.

2. The multi-laser scanning unit of claim 1, wherein the light path changing means comprises:

a plurality of planar mirrors for deflecting the plurality of scanning light lines diffracted and scanned by the deflection disk and serving as traveling paths of the light lines;

a plurality of curved mirrors for converging and reflecting the light lines incident via the planar mirrors; and a plurality of holographic optical elements for diffracting the light lines reflected by the curved mirrors.

3. The multi-laser scanning unit of claim 1, wherein the plurality of light sources are first through fourth light sources arranged in sequence to form four scanning lines, respectively, wherein the first through fourth light sources are arranged such that centers of the light lines incident onto the deflection disk pass the center point of the deflection disk and wherein incident light lines of said first through fourth light sources form pairs, and each pair of incident light lines is symmetrical with respect to a light traveling direction, and center points of the center of said light lines incident by the first and fourth light sources form an angle of 180° at a center point which is a rotary center of the deflection disk.

* * * * *